May 19, 1931. G. H. EDWARDS 1,805,979
HAT SHAPING AND PRESSING MOLD
Filed Jan. 23, 1929 2 Sheets-Sheet 1
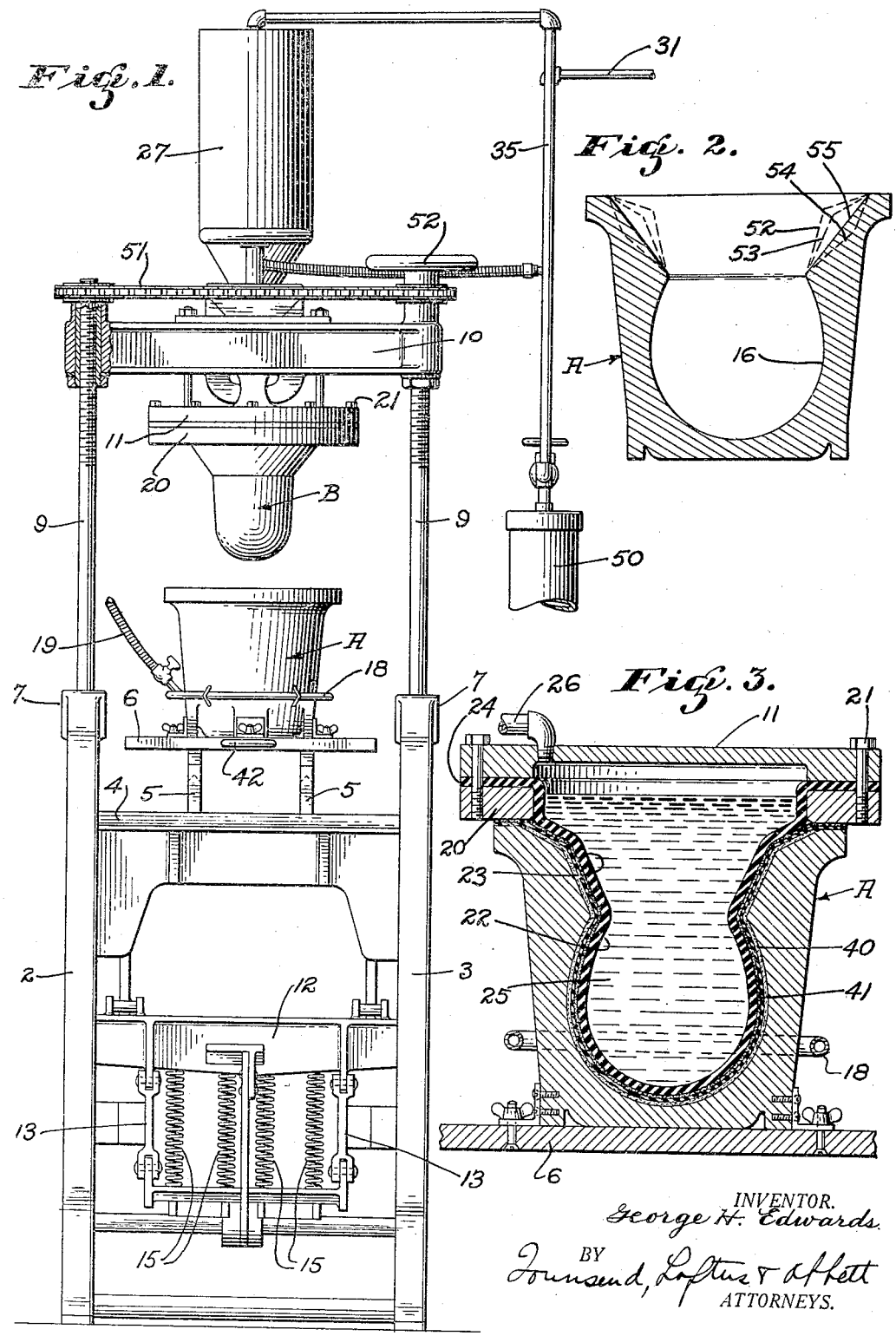

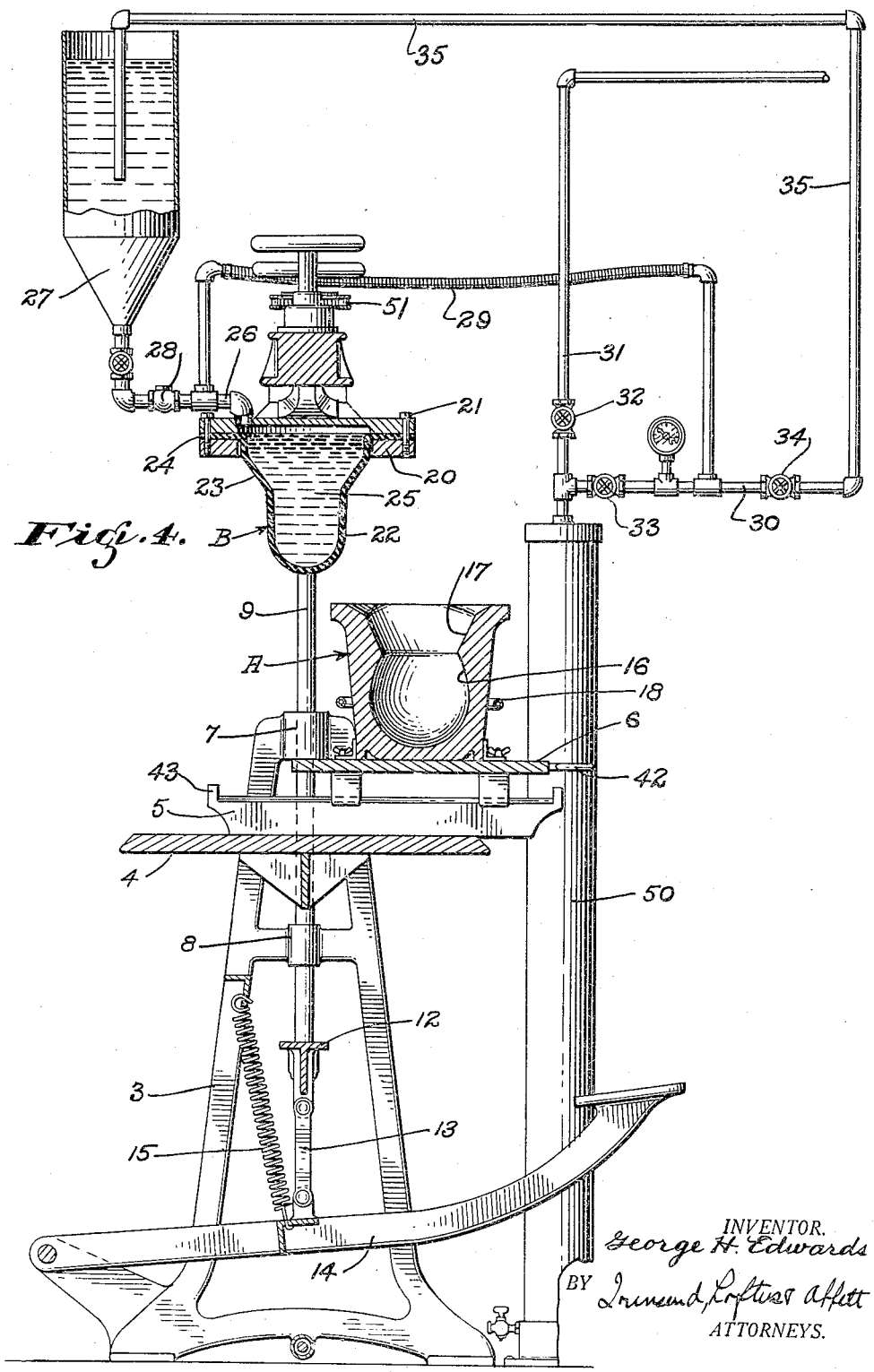

Patented May 19, 1931

1,805,979

UNITED STATES PATENT OFFICE

GEORGE H. EDWARDS, OF MILL VALLEY, CALIFORNIA, ASSIGNOR TO CATALINA HATS LTD., OF SAN FRANCISCO, CALIFORNIA, A CORPORATION OF CALIFORNIA

HAT SHAPING AND PRESSING MOLD

Application filed January 23, 1929. Serial No. 334,411.

This invention relates to molds, and especially to that type which is used for shaping and pressing hats and the like.

In hat manufacturing plants molds are used for the purpose of shaping and pressing felt hats and the like. The molds employed are made in two separable units known as male and female molds, and the hat to be shaped or pressed is placed between the same and subjected to both pressure and heat. Hats vary, both in size and shape, and this necessitates the use of numerous molds. Furthermore, an accurate fit must be maintained as uniform pressure should be exerted on the entire surface of the hat during the shaping and pressing operation.

The object of the present invention is to generally improve and simplify the construction and operation of molds of the character described, and especially to provide a mold structure which will materially reduce the number of molds required, and also eliminate accuracy in workmanship.

The invention, briefly stated, consists in providing a male mold which is constructed of rubber or a like elastic material and in providing means for expanding the same when inserted in the female mold by a combined hydraulic and pneumatic action.

The invention is shown by way of illustration in the accompanying drawings, in which:

Fig. 1 is a front view of the machine showing the molds mounted therein,

Fig. 2 is a section of the female mold,

Fig. 3 is a vertical section showing the two molds assembled,

Fig. 4 is a side elevation of the machine showing the molds and part of the machine in section.

Referring to the drawings in detail, and particularly Figs. 1 and 4, it will be noted that a machine is illustrated which consists of a pair of side frames, such as indicated at 2 and 3, between which is secured a table or like suitable support indicated at 4. Mounted on the table are guideways 5, and slidably mounted thereon is a platform 6, upon which is supported a female mold generally indicated at A. Mounted in guideways 7 and 8 formed in the side frames, are a pair of shafts 9. Supported by the upper ends of the shafts is a head frame 10, and supported by the head frame is a head member 11 and a male mold generally indicated at B. This mold is adapted to be raised and lowered with relation to the mold A, and the mechanism employed for imparting this movement consists of a cross bar 12 which connects the lower ends of the shafts 9. This cross bar is connected by means of links 13 with a foot treadle 14 and when this is depressed downward movement is imparted to the shafts 9 and the mold B supported thereby, and it is thus lowered to cooperate with the female mold, as will hereinafter be described. A plurality of springs, such as indicated at 15 are connected with the foot treadle, and when this is released the mold B is automatically elevated to assume the position shown in Figs. 1 and 4.

The female mold is best illustrated in Figs. 2 and 3. It consists of a casting constructed of aluminum or like metal, the interior portion being cored out as indicated at 16, to receive the crown of the hat to be pressed, the upper portion being flared, as indicated at 17, to receive the brim of the hat. The casting or mold is surrounded by a ring-shaped gas burner, such as shown at 18, and gas or like fuel is supplied thereto by means of a hose 19. This burner is lighted when the mold is in operation, and the flames playing upwardly around the exterior of the mold maintain it at a predetermined temperature, it being understood that both heat and pressure are required when a hat is to be shaped and pressed.

The male mold consists, as previously described, of a head member 11, to which is attached a clamping ring 20, this ring being secured to the head by means of bolts 21. Secured between the head and the clamping ring is the male mold proper. It is constructed of rubber or a similar elastic material, so that it may be readily expanded when internal pressure is applied. It consists of a lower rounded portion 22, which enters the crown portion of the female mold, and an upper flared cone-shaped section 23, which engages the brim portion of the female mold. The flared or cone-shaped section 23 terminates in an annular flange 24 which is secured between the head and the clamping ring 20. The mold is hollow, as shown, and it is filled with a liquid such as water or the like, as indicated at 25. Air under pressure is also applied when the mold is in operation, and it is thus expanded so as to apply pressure when moved into cooperating position with the mold A. The head member 11 is provided with a pipe 26 which is connected with a supply reservoir 27, a check valve 28 being interposed which permits water to flow in one direction only. Pipe 26 is also connected through means of a flexible hose 29 with a pipe 30 and this is in turn connected with a supply pipe 31 which is connected with an air compressor or other suitable source of supply. The pipes 30 and 31 are provided with three valves, such as indicated at 32, 33 and 34, and pipe 30 is also provided with an exhaust pipe such as shown at 35, which discharges into the supply tank 27.

In actual operation, when the molds are to be employed for the purpose of shaping and pressing hats, the gas is turned on and the burner 18 lighted, and when the mold A has reached a pre-determined temperature, it is ready for operation. The hat to be shaped and pressed is inserted in the mold A, and this hat is indicated in section at 40 in Fig. 3. A saddle, or liner cloth, such as indicated at 41 is next introduced and the platform 6 containing the mold is then moved inwardly by means of a handle 42. Stop lugs 43 are provided at the end of the guideways 5 and the platform is moved until the lugs are engaged. At that point alignment between the molds A and B will be obtained. The foot pedal 14 is next depressed and the mold B is thus lowered and inserted in the mold A. Valve 33 is then opened, and air under pressure will then pass through the pipes 31, 30 and 29 into the pipe 26 which finally directs the air into the head 11 where it applies pressure on top of the liquid indicated at 25, and as the mold B is constructed of rubber or a like elastic material, it will be expanded against the liner cloth 41, and the hat will thus be shaped and pressed. After the hat has been subjected to heat and pressure for a predetermined period of time, valve 33 is closed and valve 34 opened. The air previously admitted under pressure will now exhaust and discharge through the pipe 35 into the upper end of the supply tank 27.

The reason for directing the exhaust air back to the supply tank is to trap any water which may discharge from the mold B, any water discharging in this manner being automatically replaced by the tank 27 as the check valve 28 will permit the water to flow to the mold, but it will prevent reverse flow of water and air.

When the mold B has been exhausted, it is only necessary to release the foot treadle. The springs 15 will then elevate the same and the elevating movement will be transmitted through the rods 9 to raise the mold B, and when this is raised, mold A is pulled upwardly to the position shown in Fig. 4 so that the liner 41 and the hat may be readily removed. The next hat is then inserted and the same operation is repeated and repeated.

It is well known that oil is detrimental to rubber. An oil trap in the form of an elongated tank, such as shown at 50 is for this reason employed. Pipe 31, which delivers the air from the compressor is connected with the top of this tank, and any entrained oil is thus directed downwardly into the tank, where it may be collected and drained off from time to time. This is important as it frees the air of oil, and thereby prevents it from entering the rubber mold indicated at B.

By referring to Fig. 1 it will also be noted that the rods 9 are threaded at their upper ends, and that a sprocket gear and chain, such as shown at 51 is connected with the upper end of each shaft. The sprocket gears function as nuts as they have a threaded engagement with the rods and when they are rotated by means of the hand wheel 52, mold B is vertically adjusted with relation to the rods. This feature forms no part of the present invention, but it is nevertheless illustrated and referred to as it provides a means for obtaining the proper adjustment betwen the two molds.

The advantages of employing a rubber mold such as shown at B will no doubt be apparent from the following description. By referring to Fig. 2 it will be noted that the portion 16 of the mold receives the crown of the hat, and that the flared upper end receives the brim. With a given size crown it often happens that the brim assumes different angles. A number of different angles that may be employed are shown by the dotted lines indicated at 52, 53 and 54, and another angle is indicated by full lines at 55. Whenever a change of angle is required a new female mold must be made, but as long as the crown of the hat remains substantially the same, it will not be necessary to change the rubber mold, as the lower rounded portion 22 of the rubber mold will expand sufficiently to take care of any variation in the size of the crown. The upper flared portion indicated at 23 will also expand to engage any one of the angular faces indicated at 52, 53, 54, and 55, thus permitting the use of female molds of different shapes without necessitating any change in the male mold.

With molds heretofore employed, it was necessary to change the male mold whenever the female mold was changed, as the flared portion of the male mold has heretofore always been constructed of metal. Furthermore accurate machining and fitting was required as it was essential that uniform pressure be employed over the entire surface of the brim and crown. Accuracy in making the molds in this instance is not very important, as the elastic mold B will expand to take care of such discrepancies.

While certain features of the present invention are more or less specifically described, I wish it understood that various changes may be resorted to within the scope of the appended claims, similarly, that the materials and finishes of the several parts employed may be such as the manufacturer may decide, or varying conditions or uses may demand.

Having thus described my invention, what I claim and desire to secure by Letters Patent is:

1. The combination with a female mold of the character described, of a cooperating male mold, said mold comprising a head member, a mold section secured thereto, said mold section being hollow and constructed of elastic material, means for inserting the elastic mold in the female mold, said elastic mold being substantially filled with a liquid, and means for exerting air pressure on top of the liquid to expand the elastic mold with relation to the female mold.

2. In a mold structure of the character described, a male mold comprising a head member, a clamping ring, a rubber bag having an annular flange adapted to be secured between the head and the clamping ring, a liquid reservoir communicating with and adapted to supply liquid to said rubber bag, means for directing air under pressure to the interior of the bag and means whereby said air under pressure may be expelled from the bag into said reservoir.

3. In a mold structure of the character described, a male mold comprising a head member, a clamping ring, a rubber bag having an annular flange adapted to be secured between the head and the clamping ring, a liquid reservoir communicating with and adapted to supply liquid to said rubber bag, a check valve between said reservoir and bag, means for directing air under pressure to the interior of the bag, and means whereby said air under pressure may be expelled from the bag into said reservoir.

GEORGE H. EDWARDS.